United States Patent [19]

Fujino et al.

[11] Patent Number: 4,785,319

[45] Date of Patent: Nov. 15, 1988

[54] ELECTROGRAPHIC APPARATUS

[75] Inventors: Hitoshi Fujino; Masanobu Kanoto, both of Tokyo; Yutaka Kikuchi; Yoshinori Sugiura, both of Kawasaki, all of Japan

[73] Assignee: Canon Kabushiki Kaisha, Tokyo, Japan

[21] Appl. No.: 80,010

[22] Filed: Jul. 31, 1987

[30] Foreign Application Priority Data

Aug. 5, 1986 [JP] Japan ................................ 61-183984
Jul. 10, 1987 [JP] Japan ................................ 62-172477

[51] Int. Cl.[4] ............................................ G01D 15/00
[52] U.S. Cl. .................................... 346/160; 346/145
[58] Field of Search ........................ 355/44, 45, 55, 67, 355/3 SH, 14 SH, 3 R, 3 DR, 3 D; 346/160, 145, 107 R, 108, 26 L, 160.1

[56] References Cited

U.S. PATENT DOCUMENTS 4,417,260 11/1983 Kawai et al. ..................... 346/160.1
4,598,443 7/1986 Mizutani et al. .................... 355/3 R

*Primary Examiner*—Arthur G. Evans
*Attorney, Agent, or Firm*—Fitzpatrick, Cella, Harper & Scinto

[57] ABSTRACT

An electrographic apparatus includes a laser optical unit for scanningly deflecting a laser beam, a photosensitive member for receiving the laser beam from the laser optical unit to be scanned thereby, and an integrally molded frame provided with a first positioning portion for postioning and supporting the laser optical unit and a second positioning portion for postioning and supporting the photosensitive member.

22 Claims, 9 Drawing Sheets

ELECTROGRAPHIC APPARATUS

FIELD OF THE INVENTION AND RELATED ART

The present invention relates to an electrophotographic or electrographic apparatus such as a laser beam printer, an LED (light emitting diode) printer, a liquid crystal printer and an analog copying machine.

In an electrographic apparatus such as a laser beam printer, an accurate positioning is desired between an exposure optical system and a photosensitive member.

If the positioning is not accurate, the resulted images become oblique or distorted. Also, the accuracy is required also for the feeding of a recording material to an image transfer station where an image is transferred from the photosensitive member to the recording material. If the accuracy is not sufficient, the resulted image on the recording material may be deviated or tilted.

On the other hand, in order to make easy maintenance operations and jam clearance, some apparatus is divisible into an upper assembly and a lower assembly at a boundary along a passage of the recording material. In such a type of apparatus, the upper assembly contains an exposure optical system and process means for forming an image on the photosensitive member, while the lower assembly contains the image transfer means and a feeding means for feeding the recording material.

Since, however, it is difficult to provide accurate positioning between the upper assembly and the lower assembly, the quality of the image is relatively easily damaged at the image transfer station.

SUMMARY OF THE INVENTION

Accordingly, it is a principal object of the present invention to provide an electrographic apparatus wherein an image exposure position is determined relative to a photosensitive member with high precision.

It is another object of the present invention to provide an electrographic apparatus wherein the image is not deviated at an image transfer station.

It is a further object of the present invention to provide an electrographic apparatus wherein an accurate positioning between associated means is not influenced by heat or weight of an image fixing device.

These and other objects, features and advantages of the present invention will become more apparent upon a consideration of the following description of the preferred embodiments of the present invention taken in conjunction with the accompanying drawings.

DESCRIPTION OF THE PREFERRED EMBODIMENTS

Figure 1:
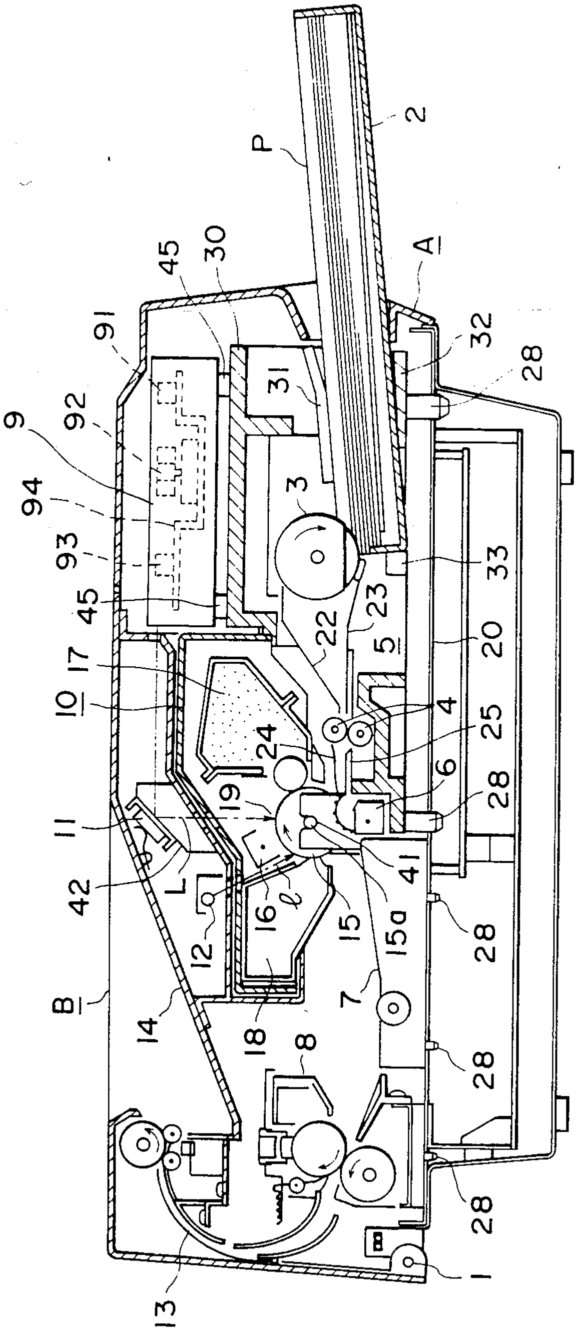
FIG. 1 is a sectional view of an apparatus according to an embodiment of the present invention wherein it is in a closed position.

Embodiments of the present invention will be described in conjunction with the accompanying drawings, wherein like reference numerals are assigned to the elements having corresponding function.

Figure 2:
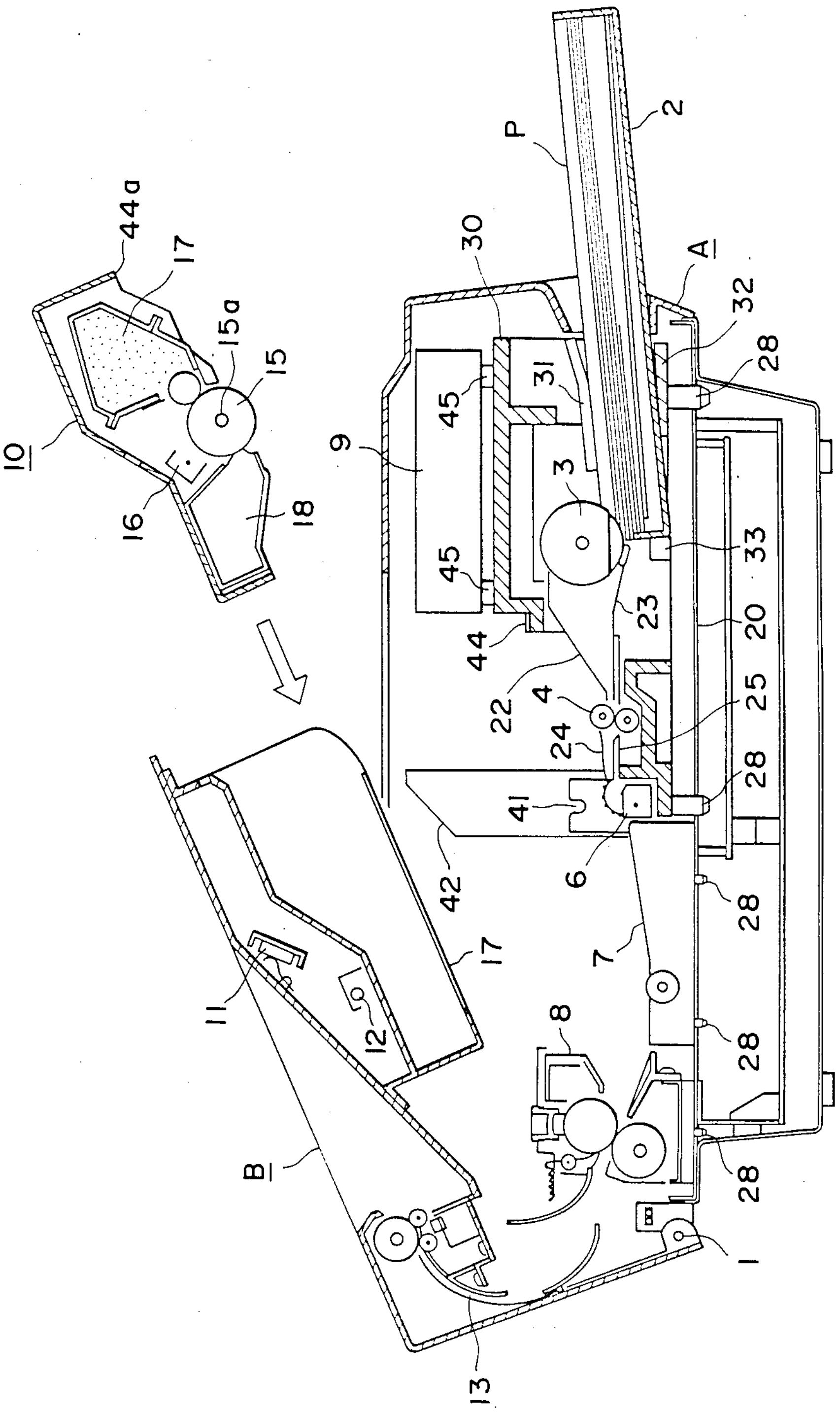
FIG. 2 is a sectional view of the same apparatus, but wherein it is opened.

Referring now to FIGS. 1 and 2, there is shown a laser beam printer according to an embodiment of the present invention. The laser beam printer is divisible into an upper assembly B and a lower assembly A for a purpose of easier operations for maintenance and for jam clearance, as best seen in FIG. 2. The upper assembly B is hinged at a hinge 1 to a lower assembly A so as to be rotatable thereabout. The upper assembly is normally urged upwardly by an urging spring not shown. When the upper assembly B is pushed down against the spring force to the lower assembly A, a locking mechanism is engaged to lock the upper assembly B to the lower assembly A to retain the upper assembly B in the closed position, as shown in FIG. 1.

When the locking mechanism is disengaged, the upper assembly B rotates about the hinge 1 away from the lower assembly A by the spring force of the urging spring, until it takes a predetermined inclined open position or a substantially vertical position. The open position is shown in FIG. 2. In this position, the inside of the apparatus becomes accessible to allow inside inspection and/or mounting or demounting of a process cartridge which will be described hereinafter.

The lower assembly A contains a sheet feeding mechanism 5 including a sheet cassette 2, sheet feeding rollers 3 and registration rollers 4 and others, a discharger 6 for transferring an image from a photosensitive member to the sheet, a sheet conveying mechanism 7 for conveying the sheet, an image fixing means 8 for fixing an image on the sheet and a laser unit 9. On the other hand, the upper assembly B contains a process cartridge 10, a laser reflecting mirror 11, a pre-exposure lamp 12, a sheet conveying mechanism 13 and a sheet discharge tray 14 and other necessary elements.

In this embodiment, the process cartridge 10 contains as a unit a photosensitive member 15 in the form of an electrophotographic photosensitive drum, which will hereinafter be called also "drum", a charger 16, a developing device 17 and a cleaning device 18. Those four devices are formed into an integral cartridge. The process cartridge is mounted into or demounted from the upper assembly B at a predetermined position thereof, when the upper assembly B is opened from the lower assembly A, as shown in FIG. 2.

The image formation or recording is carried 5 out after the upper assembly B is loaded wih the process cartridge 10 and is closed to be engaged with the lower assembly A, in other words, in the state shown in FIG. 1.

In an image forming operation, the drum 15 is rotated about a shaft 15*a* at a predetermined peripheral speed in the direction indicated by an arrow, in response to a starting signal.

During rotation, the drum 15 is exposed to uniform light 1 by a pre-exposure lamp 12, and then uniformly charged electrically to a positive or negative polarity by a charger 16. Subsequently, the drum is exposed at an exposure station 19 to a scanning laser beam L introduced from the laser beam scanning unit 9, so that an electrostatic latent image corresponding to an intended image is formed on the periphery thereof. The laser beam is modulated in accordance with the intended image.

Here, the laser beam unit includes a semiconductor laser source 91, a polygonal mirror 92, an f-θ lens 93, a supporting plate 97 for supporting them and other necessary elements.

Returning to the operation of the apparatus, a laser beam, modulated in accordance with time series electric picture element signals corresponding to the intended image, is directed from the semiconductor laser source to the rotating polygonal mirror. The deflected beam reached the drum 15 at the exposure station 19 by way of a reflecting mirror 11, so that the surface of the drum 15 is scanned by the laser beam in the direction of a generating line of the drum 15, that is, in the major scanning direction.

The thus formed electrostatic latent image on the drum 15 is developed with toner by the developing device 17 and is advanced to the transfer station having an image transfer discharger 6. In the transfer station, the developed image is continuously transferred onto a surface of the transfer sheet p which is fed into between the drum 15 and the transfer discharger 6 from the sheet feeding station 5 in synchronism with rotation of the drum 15.

The transfer sheet having received the toner image is continuously separated from the surface of the drum 15 by an unshown separating member and is advanced through the sheet conveying passage 7 to an image fixing device 8, where the transferred toner image is fixed. The sheet is then discharged as a copy or print through the passage 13 to the sheet discharge tray 14.

The surface of the drum 15 from which the transfer sheet has been separated is cleaned by the cleaning device to be prepared for the next image forming operation.

Here, the sheet feeding station 5 includes a sheet cassette 2 containing a stack of sheets p, a pick-up roller 3 in the form of a crescent roller and registration rollers 4. The pick-up roller is intermittently rotated one or plural turns in a sheet feeding direction at predetermined sheet feeding timing, and the sheets p in the cassette 2 are fed out to the registration rollers 4 one by one, correspondingly to the intermittent operations.

The sheet p singled out from the cassette 2 by the pick-up roller 3 is received by a nip formed by the registration rollers 4 which are then at rest and is once stopped thereby. At a timing in relation to rotation of the drum 15, it is advanced to the transfer station 6 by rotation of the registration rollers 4.

Figure 3:
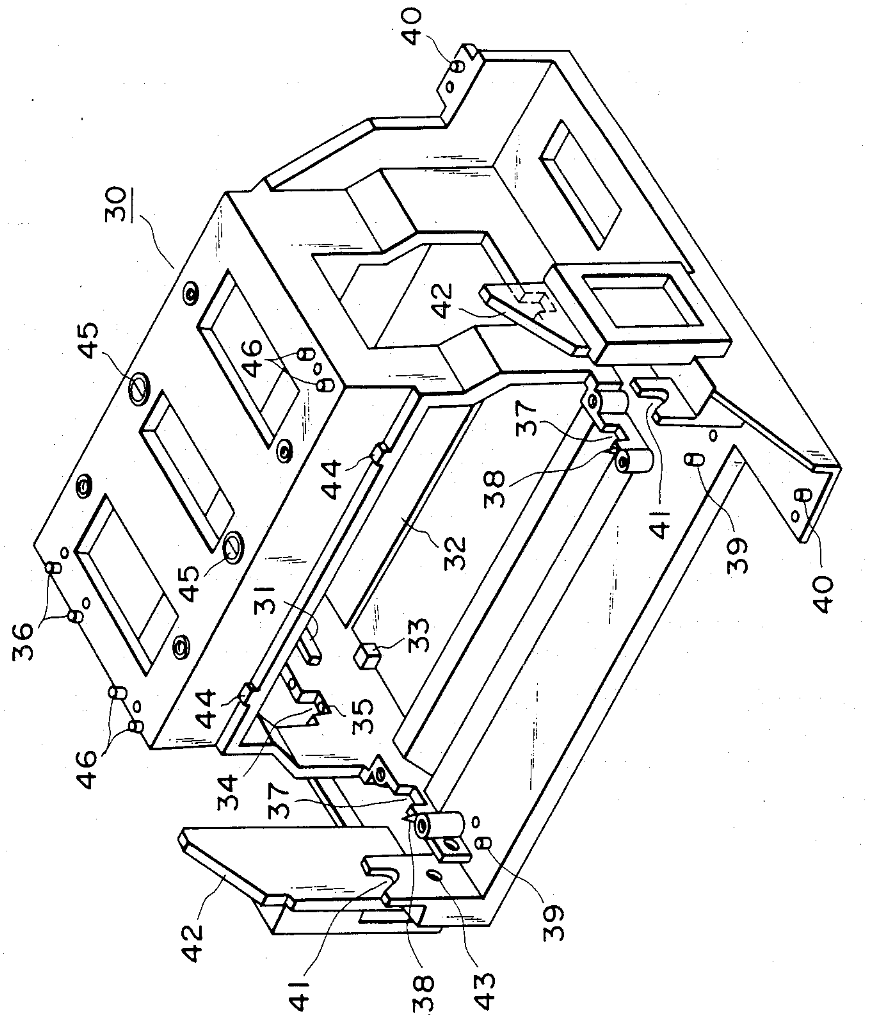
FIG. 3 is a perspective view of a main block or frame used in the embodiment shown in FIGS. 1 and 2.
Figure 4:
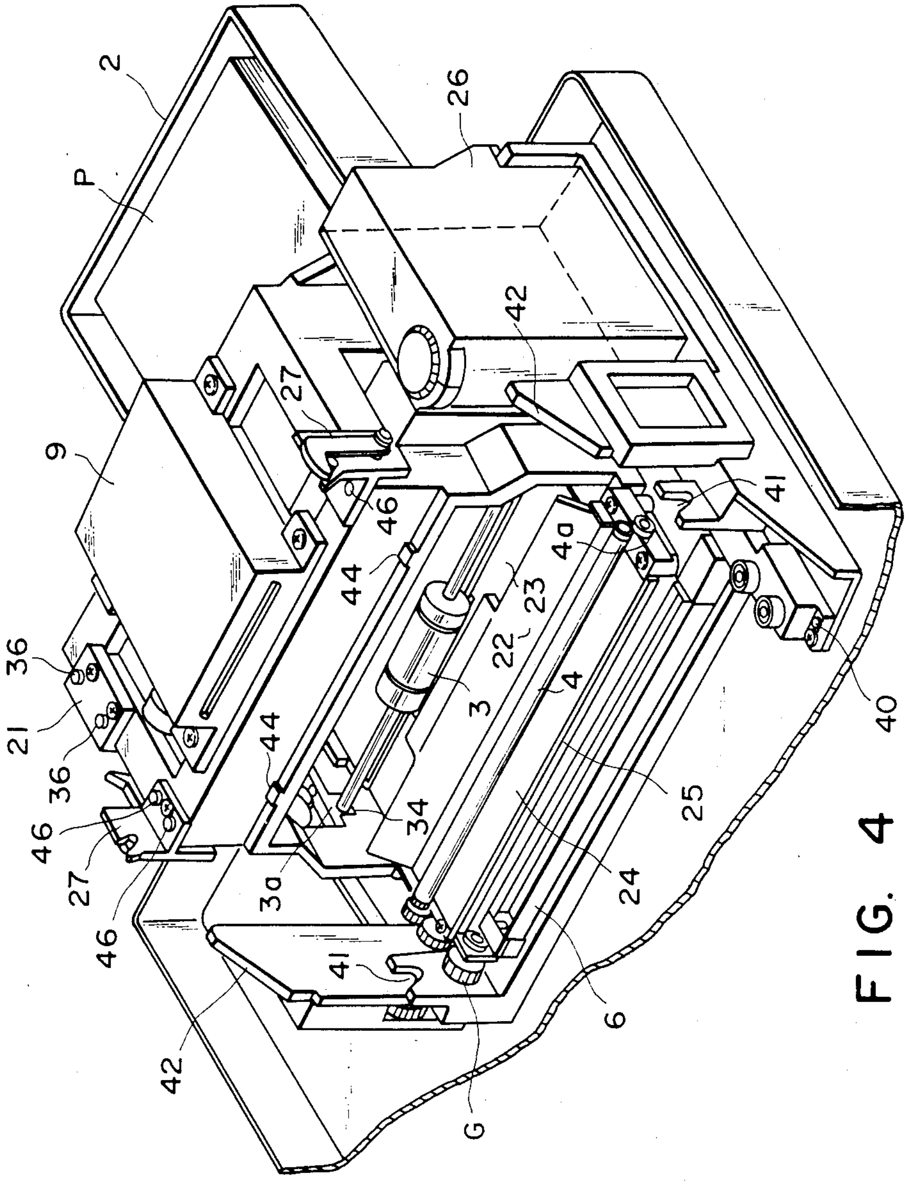
FIG. 4 is a perspective view of the block to which various elements are mounted.

Referring to FIGS. 3 and 4, the important parts of this embodiment will be described.

FIG. 3 illustrates a main block or frame 30 used in the laser beam printer shown in FIGS. 1 and 2. FIG. 4 shows the same block 30 which, however, is mounted on a base 20 of the apparatus and is provided with various elements.

The main block 30 is made by injection-molding from synthetic resin material into an integral construction. Exemplary synthetic resin materials are PPO (polyphenylene oxide) or ABS resin into which glass fiber or other inorganic filler materials are mixed by 20–40%. It is a three dimensional injection molded member, and particularly it is preferable to be slightly foamed. By doing so, the rigidity is enhanced so that the thickness of the block 30 may be reduced, for example, to 5 mm, and simultaneously the dimensional accuracy is improved.

The integrally formed main block 30 is provided with a bearing groove 41 for receiving and positioning the drum shaft 15*a*, and therefore, the drum 15 and is also provided with a positioning portion 45 for positioning the laser unit 9. It should be appreciated that the positioning portion 45 for the laser unit 9 and the positioning portion 41 for the drum are on one and the same member, that is, the integrally molded block. This is significant in that the laser unit for providing the deflected laser beam and the drum scanned by the very laser beam are positioned on the same member, so that the relative positional relationship between the drum 15 and the exposing laser beam can be made accurate by a simple structure.

In this embodiment, a folding reflecting mirror 11 is employed to fold the laser beam optical path. In order also to enhance the optical positioning accuracy of the reflecting mirror 11, the integrally molded main block 30 is also provided with a seating surface 42 for positioning the reflecting mirror 11.

Furthermore, the main block 30 includes the following positioning portions:

(a) An opening 43 constituting a bearing for positioning a driving gear G for driving the drum 15, by which the accuracy of driving the drum 15 is increased:

(b) An abutment 44 to which a bottom surface 44*a* of the process cartridge 10 coming from upward is abutted to correctly position the process cartridge 10, by which the positional accuracy of the process cartridge during operation can be assured together with the positional accuracy of the drum 15.

According to this embodiment described above, an image can be formed on the photosensitive drum 15 without distortion or positional deviation. Additionally, according to the present invention, the accuracy of image transfer is increased when the image on the photosensitive drum 15 is transferred onto a transfer sheet. This will be described in more detail. It is required for the transfer sheet to be fed without inclination. In consideration of this, the integrally molded main block 30 is provided also with positioning portions for positioning a sheet feeding unit for feeding the sheet to the transfer station, as follows:

(a) Guiding rails 31 and 32 and an abutment 33 for guiding and correctly positioning the sheet cassette 2:

(b) A groove 34 and a pin hole 35 for receiving and positioning a bearing 3*a* of the sheet feeding roller unit containing the feeding rollers 3:

(c) A positioning pin 36 for mounting and positioning a feed driving motor unit 21:

(d) A groove 37 for receiving and positioning a registration roller bearing 4*a* to correctly position in a direction of the sheet feeding the registration unit, the registration unit being constituted by feed guiding plates 22 and 23, a registration roller couple 4 and guiding plates 24 and 25; and a pin 38 for positioning same in the lateral direction:

(e) A positioning pin 39 for positioning a transfer guide unit containing an image transfer discharger 6.

In this manner, the main block 30 has the positioning portions for the sheet feeding unit, whereby the transfer sheet can be supplied to the photosensitive drum with a high positional accuracy. Further, since the main block 30 is provided with the positioning portion for the image transfer unit, the image transfer accuracy is further increased together with the positional accuracy described above.

In addition, the main block 30 in this embodiment has a positioning pin 40 for positioning a high voltage unit 26, and also a positioning pin 46 for positioning a locking mechanism unit 27 for locking the upper assembly B with the lower assembly A.

The above-described positioning portions 31–40, and 42–46 are correctly dimensionally interrelated, with reference of the position of the bearing groove 41 for the drum shaft 15*a*, in their levels for the respective units and elements, their intervals and dimensions. Such a dimensionally accurate structure can be produced by, for example, injection-molding a resin material through a mass-production system.

A block assembly is constituted by mounting, with screws or the like, to the respective portions the above described feeding roller unit, the motor unit 21, the registration unit, the transfer guide unit, the high voltage unit 26, the drum driving gear G, the laser unit 9 and a locking mechanism unit 27, as shown in FIG. 3. The mounted units and elements are correctly interrelated in relative positions.

The block assembly thus provided is directly mounted to the base plate 20 of the lower assembly A functioning as a base of the apparatus, using a positioning pin 28 and a corresponding opening, by screws or the like. Thus, the block assembly is detachably mounted to the base of the apparatus.

The sheet feeding mechanism 7, the image fixing device 8, the main motor unit (not shown) and a power source (not shown) are also mounted to the base plate 20 of the lower assembly A by the pin 28 and the corresponding positioning opening. In the manner described in the foregoing, the apparatus is made simple and small very much, and the minimum required functions for the image formation are concentratedly positioned and/or supported on the main block 30, so that the high accuracy of the integral molding is effectively utilized to enhance the entire positional accuracy in the apparatus.

It should be noted that the main block 30 does not support on purpose the image fixing device 8. The reason for not supporting it will be described. If the fixing device is a heat fixing type, the heat produced therein may deform, expand or contract the synthetic resin material. In the case of a pressure fixing type image fixing device, it is usually very heavy, so that the synthetic resin material may be deformed or distorted.

When, for example, the base plate 20 and the main block 30 is formed as an integral molded structure, the bottom area of the synthetic resin material is doubled, and therefore the problem becomes more serious. Therefore it is preferable that the image fixing device 8 is not mounted to the main block 30.

In combination with the fact, the positional relation of the fixing device with the other parts of the apparatus is much less important.

As described in the foregoing, the laser unit introducing the deflected laser beam and the photosensitive member is correctly positioned, and particularly, the process cartridge is correctly positioned with respect to the main block 30, the laser exposure position of the drum 15 is accurate.

Additionally, the sheet feeding unit is also positioned with respect to the main block 30, by which the timing and the position of the transfer sheet contacting the drum 15 are both accurate.

Furthermore, the main block 30 is three-dimensional, and therefore, vibrations produced by the semiconductor laser scanner and the driving system are easily attenuated, and the resonance is difficult to occur.

It is possible to mount the above described units and elements to the main block to constitute a unit, and the constituted unit is inspected in the factory, it is possible to find the problems of unsatisfactory image formation and unsatisfactory sheet feeding beforehand. Therefore, only satisfactory block units may be assembled into the main assembly with the result of better productivity.

Another embodiment which is better than the first embodiment in some aspect will be described.

Figure 5:
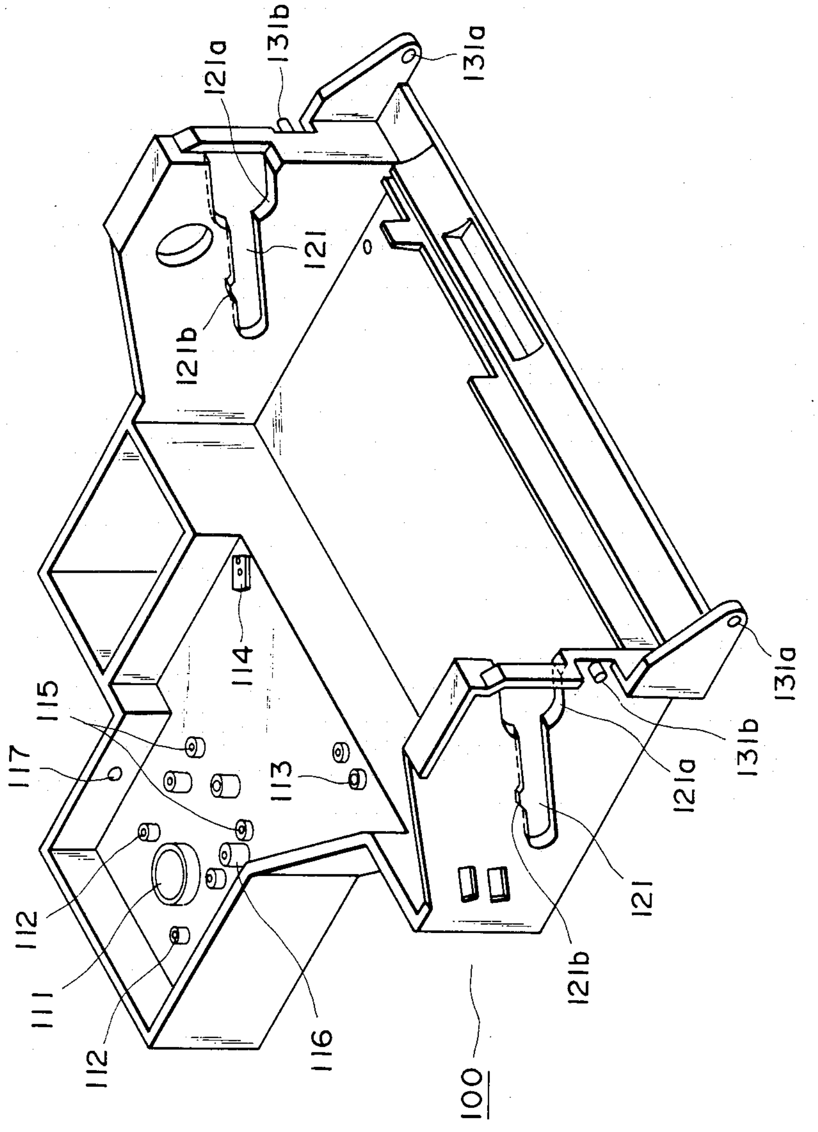
FIG. 5 is a perspective view of a main frame used with an apparatus according to another embodiment of the present invention.
Figure 6:
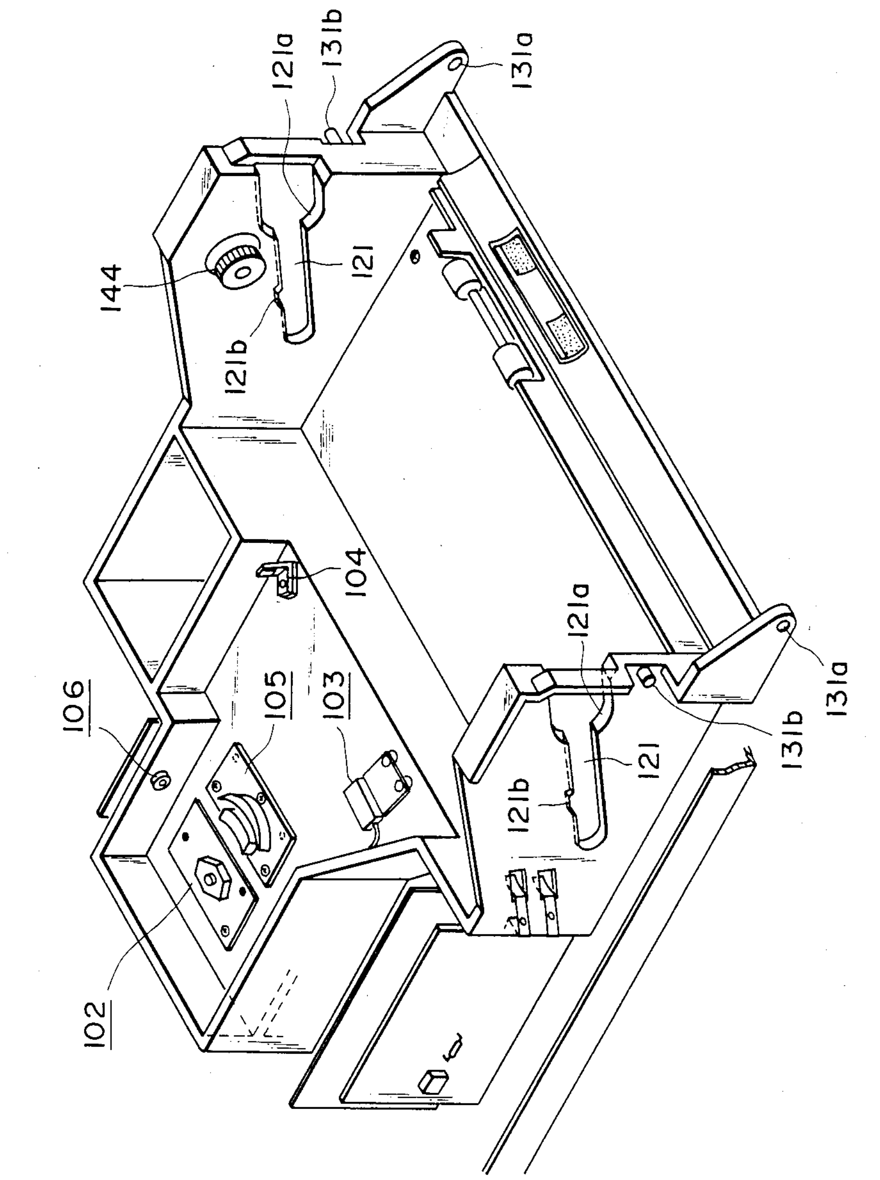
FIG. 6 is a perspective view of the same main frame to which optical element and others are mounted.
Figure 7:
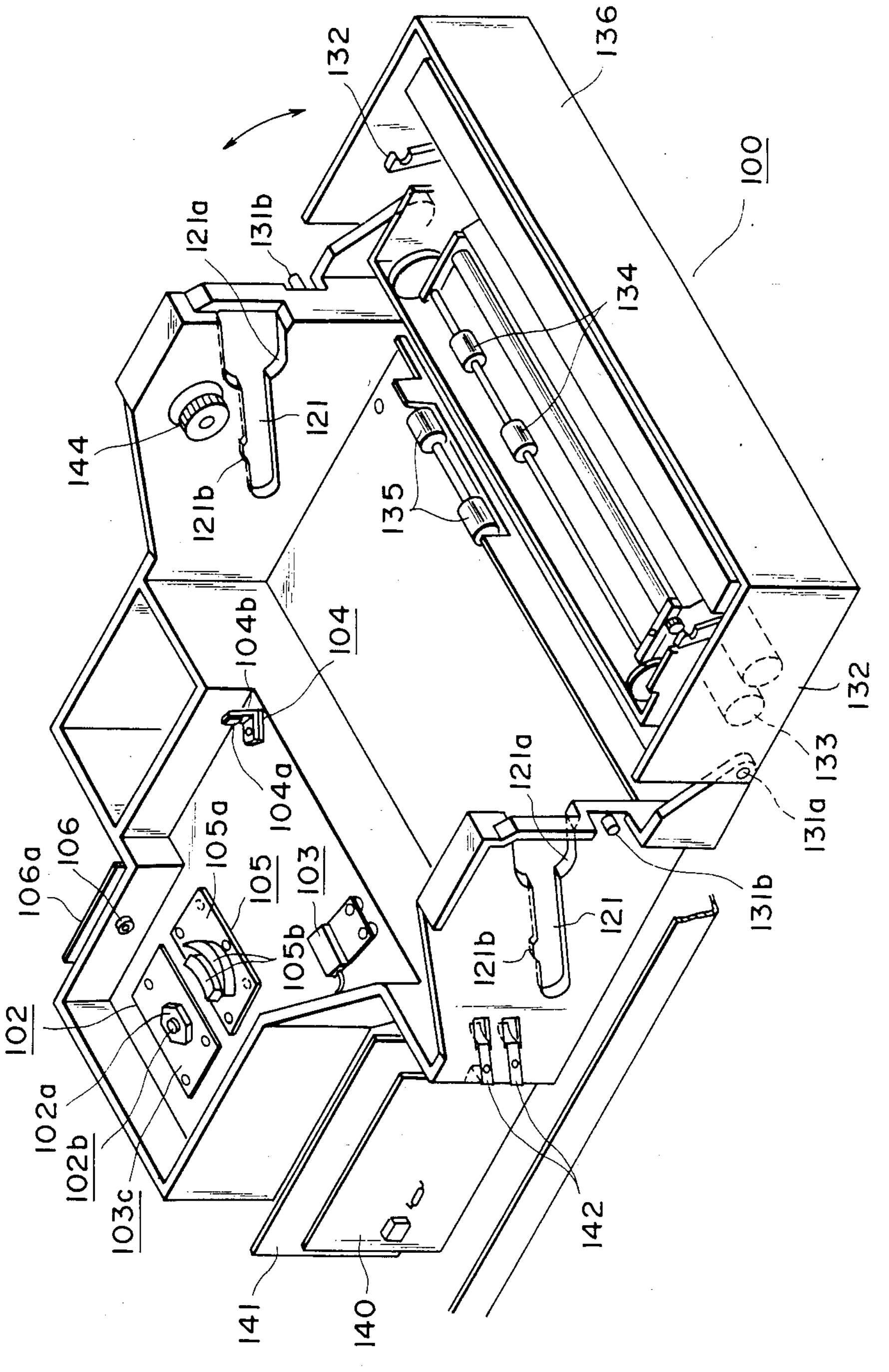
FIG. 7 is a perspective view of the same with feeding unit mounted thereto.

Referring to FIGS. 5–7, another embodiment of the present invention is illustrated. FIG. 5 is a perspective view of the main block alone; FIG. 6 illustrates the same block but with optical elements mounted thereto; and FIG. 7 shows the same block with sheet feeding unit mounted thereto.

The main block 100 is likewise formed by injection molding into an integral frame. In order to correctly position and mount optical elements, the main block 100 is provided with a positioning hole 111 for positioning a rotational mirror unit, that is, a polygonal mirror scanner unit 102 in this embodiment, a fixing portion 112 for fixing the polygonal scanner by screws or the like, a positioning hole 115 for positioning a lens unit, a fixing portion for fixing the lens unit 105 by screws or the like, a positioning portion 113 for positioning and fixing a detecting unit 103 for detecting deflection of the laser beam, and a positioning portion for positioning and fixing a mirror unit 104 for directing the laser beam to the detecting unit and a positioning hole 117 for positioning the laser source unit 106 including a semiconductor laser element and a collimator lens.

By fixing those optical elements and unit to the respective positioning and fixing portions, a laser optical system is established, as shown in FIG. 6.

The main block 100 is further provided with a positioning portion 121 for positioning the process cartridge. The process cartridge positioning portion 121 includes a positioning portion 121*a* for positioning the photosensitive drum and a positioning and retaining portion 121*b* for positioning and retaining the process cartridge. The positioning of the photosensitive drum and the process cartridge will be described in detail hereinafter.

The main block 100 further includes positioning portions 131*a* and 131*b* for positioning a sheet feeding unit 100 for feeding the transfer material. The feeding unit 100 is rotatable about a shaft 131*a* in the direction indicated by an arrow. When the feeding unit is to be closed, a lock lever 132 is engaged with a positioning projection 131*b*, as shown in FIG. 7. The feeding unit will be described further in detail hereinafter.

Referring to FIG. 7, the polygonal scanner unit 102 includes a rotational polygonal mirror 102*a* rotatable in one direction, a rotational shaft 102*b*, a printed board 130*c* and an unshown driving motor.

The lens unit 105 includes a lens holder 105*a* and an f-$\theta$ lens group bonded securedly to the lens holder 105*a*.

The detecting unit 103 includes optical fibers and determines the time of modulation start of the laser beam on the basis of the incidence of the laser beam onto the optical fiber.

The detecting mirror unit comprises a detecting mirror 104*a* and a holder 104*b* to which the mirror 104*a* is bonded securedly.

The laser source unit 106 has a drive board 106*a* containing IC chips for controlling generation of the semiconductor laser beam.

As will be understood from the foregoing, the positioning portion for the polygonal scanner unit which is a reference of the optical scan and the positioning portion for the photosensitive member to be scanned, are on one and the same member, so that the positional relationship therebetween is very accurate. In the assembling stage, the correct positioning is accomplished simply by mounting them to the respective positioning portions. Additionally, the positioning of the process cartridge is made using the positioning portion which is provided also on the same member, whereby the laser beam can be introduced exactly at a predetermined position.

Also, in this embodiment, the positioning portions for the optical elements such as the laser source unit 106, the lens unit 105, the beam detecting unit 103, the beam detecting mirror unit 104 are also formed on the same integrally molded structure. Therefore, the optical accuracy in connection with the photosensitive member is high with a simple structure, which leads to sharp images without disturbance.

The optical elements are constructed into respective units, which in turn are mounted to the base plate, so that they are easily assembled with the advantage of simple exchanging operation with a new unit. Additionally, even if a unit or units are exchanged, high accuracy can be obtained.

As shown in FIG. 7, the apparatus comprises a high voltage source 140 for supplying high voltage power to charging means and developing means, a DC source 141 for supplying a DC voltage to a control circuit or the like, high voltage terminals 142 for supplying a high voltage to the process cartridge, the terminals 142 being adapted to contact terminals 204 (FIG. 2A) of the process cartridge when it is inserted into the apparatus, and a photosensitive drum driving gear 144 for driving the photosensitive drum by the driving force from an unshown main motor which is also effective to drive as a roller in the sheet feeding system.

The description will be made with respect to a positioning and supporting structure for the photosensitive drum and the process cartridge.

Figure 8:
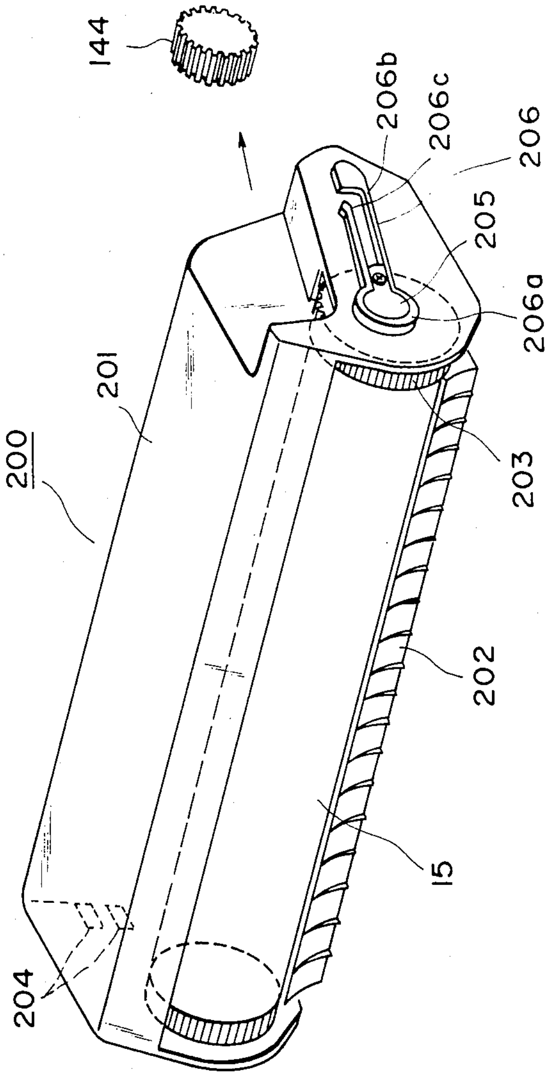
FIG. 8 is a perspective view of a process cartridge usable with the embodiment.
Figure 9:
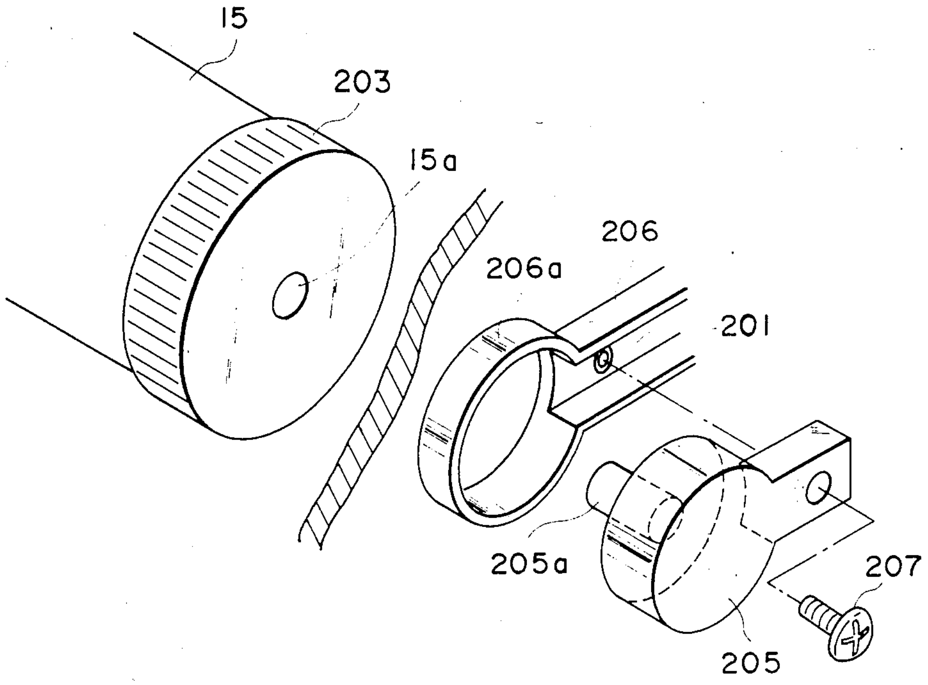
FIG. 9 is a perspective view partly broken away, illustrating support of a photosensitive drum.
Figure 10:
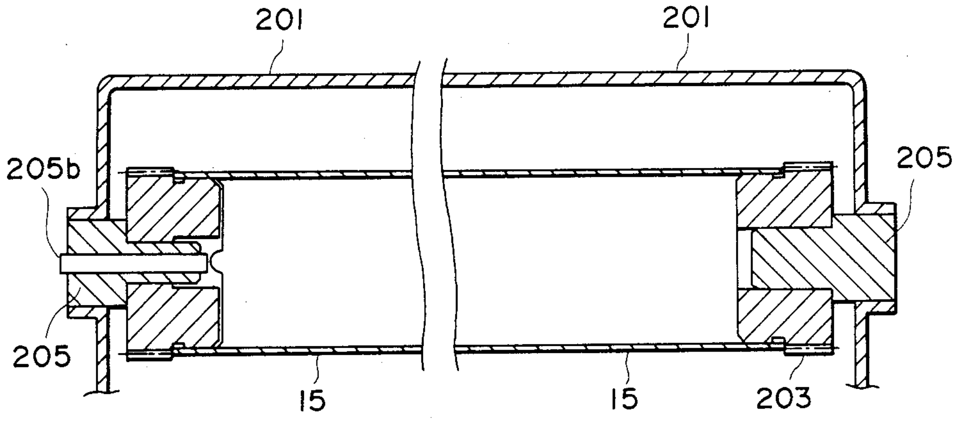
FIG. 10 is a somewhat schematic sectional view of the process cartridge.

Referring to FIGS. 8–10, there is shown a process cartridge usable with the embodiment of FIGS. 5–7. FIG. 8 is a perspective view thereof; FIG. 9 illustrates how the photosensitive drum is supported therein; and FIG. 10 is a somewhat schematic longitudinal section.

The process cartridge contains not only the photosenstive member but also a primary charger, the developing device and a cleaning device, which however are not shown in FIGS. 8–10 since they form no important part of this invention.

As shown in FIG. 8, the process cartridge 200 containing the photosensitive drum 15 is covered by a frame 201, which has a bottom portion at the drum 15 side which is formed into a sheet guide 202 to guide the transfer material moving toward the photosensitive member.

A gear 203 is mounted to the photosensitive drum at its one end and is meshed with the drum driving gear 144, so that the photosensitive drum is rotated by rotation of the drum driving gear 144. The process cartridge is provided with high voltage terminals 204 contactable with contacts of the main assembly, as described hereinbefore. The process cartridge is provided with a supporting pin for supporting the photosensitive drum 15 and, a positioning portion 206 for positioning the photosensitive drum and the process cartridge, wherein the process cartridge being correctly positioned to the main assembly by the positioning portion 206 of the process cartridge is correctly positioned with respect to the positioning portion 121 of the main assembly.

The positioning portion 206 of the process cartridge includes a positioning portion 206*a* for positioning the photosensitive drum, a positioning portion 206*b* for preventing the process cartridge from being tilted and a click portion 206*c*.

The positioning portion 206*a* is in the form of arc concentric with the photosensitive member and is engageable with the positioning portion 121*a* of the main assembly to be correctly position relative thereto. The click 206*c* is adapted to be resiliently engaged to the retaining portion 121*b* of the main assembly so as to prevent movement of the process cartridge by a small force. The click portion 202*c* is effective to prevent deterioration of the image which may otherwise be caused by little vibration imparted to the apparatus. The resilient retaining force provided with the click portion 206 is so small that it will not obstruct operators withdrawing or mounting the process cartridge.

The positioning portion 206 is integrally formed with the frame 201 of the process cartridge 201. The click portion 206*c* is about 1 inch in length in order to assure the resiliency thereof and is slightly away from the frame 201 with a small clearance.

Referring to FIG. 9, the description will be made as to the mechanism for supporting the photosensitive drum. There is formed a hole 15*a* at the center of a longitudinal end wall of the photosensitive drum 15. Into the hole 15*a*, a positioning projection 205*a* of a supporting pin is inserted, by which the rotational center of the photosensitive drum is determined.

The supporting pin 205 is fixed by screws to the frame 201 of the process cartridge. The supporting pin 205 has a diameter which is equal to or very slightly larger than the inside diameter of the positioning portion 206*a* so as to provide a very small play, thus enhancing the positioning accuracy.

Referring to FIG. 10, the supporting structure is illustrated in section. The left side supporting pin 205 has an electric contact 205*b* which is effective to ground the photosensitive drum 15.

Referring back to FIG. 7, the sheet feeding unit will be described. The sheet feeding unit 100 includes feeding rollers 133 and registration rollers 135 to feed the transfer material to the transfer station and also has an unshown image transfer means.

If the transfer material is jammed at the sheet feeding portion or at the image transfer station, the sheet feeding unit is opened as shown in FIG. 7 to allow disposal of the jammed sheet.

Using this sheet feeding units, the positional accuracy of the sheet feed to the photosensitive member is high, since the sheet feeding unit is constructed as a unit, since the unit is positioned and mounted to the positioning portion 131*a* of an integrally molded main frame 100 and also since the closing position thereof taken during operation is determined by a positioning projection integral with the mold.

For the purpose of further enhancing the positnal accuracy of the sheet feeding unit, the frame 136 of the feeding unit and the locking lever 132 are preferably formed integrally, since they are the reference for mounting the sheet feeding roller system. The rollers designated by a reference numeral 135 are cooperable with the registration rollers 134 when the sheet feeding unit 100 is closed with respect to the block assembly.

As described in the foregoing, a positioning portion for the sheet feeding unit is on the integrally formed mold, so that the accuracy of the image transfer onto the transfer material is increased. Thus, the positional accuracies from the exposure to the laser beam to the image transfer are all increased, whereby the image recording as a whole is stabilized and increased.

In operation, a laser beam modulated in accordance with the information to be recorded is produced from the semiconductor laser source and is scanningly deflected by the polygonal mirror 102a. The laser beam is passed through the f-$\theta$ lens 105b to be corrected in its f-$\theta$ property and is incident on the photosensitive member 15 which has uniformly been charged by a primary charger. The laser beam scans the photosensitive member by the deflection of the polygonal mirror 102a. By the exposure of the photosensitive member 15, an electrostatic latent image is formed on the surface of the photosensitive member.

The thus formed electrostatic latent image is developed by the developing device into a toner image, which is in turn transferred onto a transfer sheet which is fed to the transfer station. The transfer material is introduced to an image fixing means, where the transferred image is fixed on the recording sheet. Finally, the recording sheet is discharged out of the apparatus.

While the invention has been described with reference to the structures disclosed herein, it is not confined to the details set forth and this application is intended to cover such modifications or changes as may come within the purposes of the improvements or the scope of the following claims.

For example, the deflecting means may be the one using hologram or it may be a galvano mirror. As for the beam generating source, a He-Ne laser is usable.

What is claimed is:

1. An electrographic apparatus, comprising:
a photosensitve member;
an optical unit for projecting onto said photosensitive member image information light formed in accordance with an electric signal; and
an integrally molded frame provided with a first positioning portion for positioning the optical unit and a second positioning portion for positioning said photosensitive member.

2. An apparatus according to claim 1, wherein said frame is of injection-molded synthetic resin.

3. An apparatus according to claim 1, further comprising an image transfer unit for transferring an image formed on said photosensitive member onto a recording material, wherein said frame is further provided with a third positioning portion for positioning said image transfer unit.

4. An apparatus according to claim 3, further comprising means for feeding the recording material, wherein said frame is further provided with a fourth positioning portion for positioning and supporting said feeding means.

5. An apparatus according to claim 1, wherein said laser optical unit includes a emitting source, means for scanningly deflecting the laser beam produced by the laser source and a supporting member for supporting them.

6. An apparatus according to claim 1, wherein said laser optical unit is a beam deflecting unit for scanningly deflecting the laser beam directed thereto without deflection.

7. An apparatus according to claim 6, wherein the deflecting unit includes a rotational mirror and a driver for rotating it.

8. An electrographic apparatus to which a process cartridge is detachably mountable, the process cartridge including a photosensitive member to be scanned by image information light and at least one process means actable on the photosensitive member, said apparatus comprising:
an optical unit for projecting onto said photosensitive member image information light formed in accordance with an electric signal; and
an integrally molded frame provided with a first positioning portion for positioning said optical unit, a second positioning portion for positioning the process cartridge and a third positioning portion for positioning the photosensitive member in said process cartridge.

9. An apparatus according to claim 8, wherein said frame is of injection-molded synthetic resin.

10. An apparatus according to claim 8, further comprising an image transfer unit for transferring an image formed on said photosensitive member onto a recording material, wherein said frame is further provided with a third positioning portion for positioning said image transfer unit.

11. An apparatus according to claim 10, further comprising means for feeding the recording material, wherein said frame is further provided with a fourth positioning portion for positioning and supporting said feeding means.

12. An apparatus according to claim 8, wherein said process cartridge includes as the process means a charger for charging the photosensitive member, developing means for developing an image formed on the photosensitive member and cleaning means for cleaning the photosensitive member, wherein said second positioning portion positions those process means.

13. An apparatus according to claim 8, wherein said laser optical unit includes a emitting source, means for scanningly deflecting the laser beam produced by the laser source and a supporting member for supporting them.

14. An apparatus according to claim 8, wherein said laser optical unit is a beam deflecting unit for scanningly deflecting the laser beam directed thereto without deflection.

15. An apparatus according to claim 14, wherein the deflecting unit includes a rotational mirror and a driver for rotating it.

16. An electrographic apparatus, comprising:
a photosensitive member;
an optical unit for projecting onto said photosensitive member image information light formed in accordance with an electric signal;

image transfer means for transferring the image from said photosensitive member onto a recording material;

an integrally molded main frame for positioning and supporting said photosensitive member and said optical unit and said image transfer means; and image fixing means for fixing on the recording material the image transferred from said photosensitive member, said fixing means being positioned and supported on a frame separate from said main frame.

17. An apparatus according to claim 16, wherein said main frame is of injection-molded synthetic resin.

18. An apparatus according to claim 16, further comprising means for feeding the recording material, wherein said main frame is provided with a fourth positioning portion for positioning and supporting sid feeding means.

19. An electrographic apparatus to which a process cartridge is detachably mountable, the process cartridge including a photosensitive member and at least one process means actable on said photosensitive member, comprising:

an optical unit for applying image information light formed in accordance with an electric signal onto said photosensitive member for forming an image thereon;

image transfer means for transferring the image from said photosensitive member to a recording material;

an integrally molded main frame for positioning and supporting the process cartridge, said optical unit and said transfer means; and image fixing means for fixing the image on the recording material, said fixing means being positioned and supported on a frame separate from said main frame.

20. An apparatus according to claim 19, wherein said main frame is of injection-molded synthetic resin.

21. An apparatus according to claim 19, further comprising feeding means for feeding the recording material, wherein said main frame further positions and supports said feeding means.

22. An apparatus according to claim 19, wherein said main frame is provided with a portion for positioning the photosensitive member.

* * * * *

UNITED STATES PATENT AND TRADEMARK OFFICE

CERTIFICATE OF CORRECTION

PATENT NO. : 4,785,319

DATED : November 15, 1988

INVENTOR(S) : HITOSHI FUJINO, ET AL.

It is certified that error appears in the above-identified patent and that said Letters Patent is hereby corrected as shown below:

AT [56] IN REFERENCES CITED

U.S. Patent Documents, "4,598,443 7/1986 Mizutani et al." should read --4,598,993 7/1986 Mizutani et al.--.

AT [57] IN THE ABSTRACT

Line 6, "postioning" should read --positioning--.
Line 7, "postioning" should read --positioning--.

COLUMN 2

Line 60, "5" should be deleted.

COLUMN 3

Line 20, "reached" should read --reaches--.

COLUMN 6

Line 13, "factory, it" should read --factory. It--.

COLUMN 7

Line 59, "senstive" should read --sensitive--.

UNITED STATES PATENT AND TRADEMARK OFFICE
CERTIFICATE OF CORRECTION

PATENT NO. : 4,785,319

DATED : November 15, 1988

INVENTOR(S) : HITOSHI FUJINO, ET AL.

It is certified that error appears in the above-identified patent and that said Letters Patent is hereby corrected as shown below:

COLUMN 8

Line 20, "of arc" should read --of an arc--.
Line 27, "click portion 202c" should read --click portion 206c--.
Line 31, "206" should read --206c--.
Line 34, "process cartridge 201." should read --process cartridge 200.--
Line 64, "units," should read --unit,--.

COLUMN 10

Line 4, "laser" should be deleted.
Line 4, "emitting source," should read --laser emitting source,--.
Line 9, "laser" should be deleted.
Line 9, "beam deflecting unit" should read --laser beam deflecting unit--.
Line 52, "laser" should be deleted.
Line 52, "emitting source," should read --laser emitting source,--.
Line 57, "laser" should be deleted.
Line 57, "beam deflecting unit" should read --laser beam deflecting unit--.

UNITED STATES PATENT AND TRADEMARK OFFICE
CERTIFICATE OF CORRECTION

PATENT NO. : 4,785,319
DATED : November 15, 1988
INVENTOR(S) : HITOSHI FUJINO, ET AL.

It is certified that error appears in the above-identified patent and that said Letters Patent is hereby corrected as shown below:

COLUMN 11

Line 17, "sid" should read --said--.

Signed and Sealed this

Tenth Day of October, 1989

*Attest:*

DONALD J. QUIGG

*Attesting Officer*

*Commissioner of Patents and Trademarks*